UNITED STATES PATENT OFFICE.

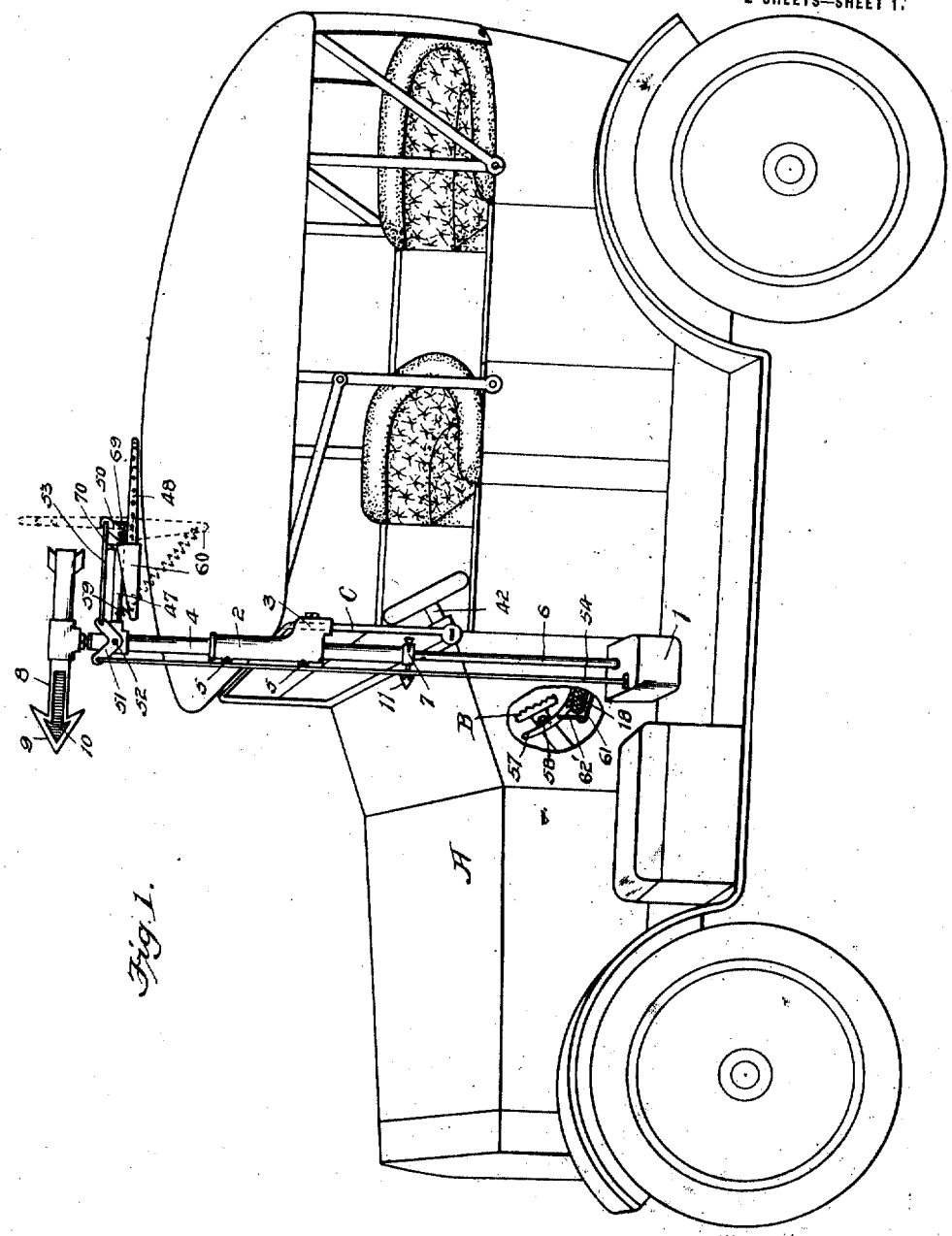

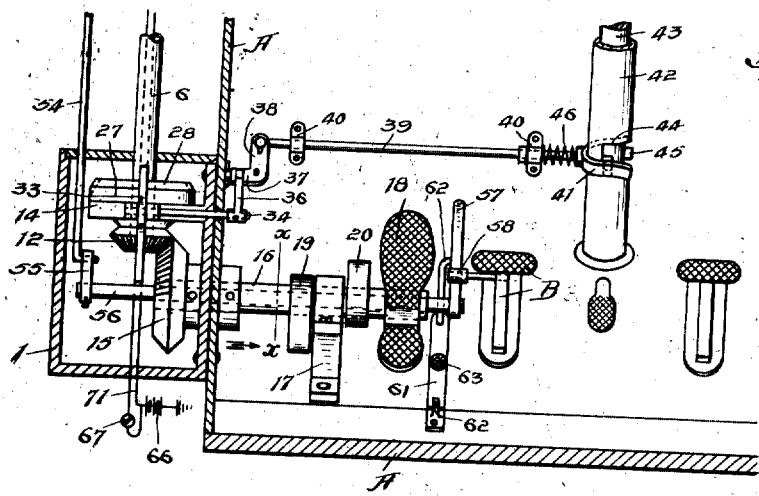

JOSEPH G. ANTHONY, OF ST. LOUIS, MISSOURI.

TRAFFIC-SIGNAL.

1,251,949.

Specification of Letters Patent.

Patented Jan. 1, 1918.

Application filed May 8, 1916. Serial No. 96,059.

*To all whom it may concern:*

Be it known that I, JOSEPH G. ANTHONY, a citizen of the United States, residing in the city of St. Louis, county of St. Louis, and State of Missouri, have invented a new and useful Traffic-Signal, of which the following is a specification.

My invention relates to improvements in traffic signals, and more particularly to a vehicle direction and caution indicator adapted to be carried by the vehicle.

The objects of my improvements are:

First, to provide a signaling device comprising a turning indicator and a caution indicator adapted to be preferably mounted adjacent the left hand edge of a wind-shield and extend upwardly therefrom sufficiently to permit pedestrians and traffic from all directions to readily see and observe the intended movements of the vehicle, whether the vehicle top is raised or lowered; second, to provide foot actuated means for moving the turning indicator, which is adapted to signal the intended turning movement of the vehicle; third, to provide foot actuated means for displaying the caution indicator for signaling traffic or pedestrians from all directions as to the contemplated movements of the vehicle, such for instance as slackening up speed, the intention of passing a vehicle, signaling the right-of-way at crossings, and the stopping or starting of a vehicle; fourth, to provide means whereby the caution indicator may be actuated either by the disengaging movement of the friction clutch foot pedal, or an independent connection actuated by the foot; fifth, to provide means for normally holding the turning indicator in its forward or neutral position; sixth, to provide means actuated by the steering post of a motor-vehicle for releasing the turning indicator from its normal locked position, after having turned a corner, to permit it to return to its forward or neutral position without any foot action or thought on the part of the driver; seventh, to provide electric lamps housed in the turning indicator and the caution indicator, so that the indicators may be illuminated by battery current at night; and eighth, to provide means whereby the caution indicator is only illuminated when it is moved into its caution signaling position.

With the above and other objects in view which will be set forth more fully hereinafter, the invention consists in certain new and novel features of construction, arrangement and combination of parts, as will be more fully described hereinafter and finally pointed out in the claim hereto appended.

Referring to the accompanying drawings forming a part of this specification wherein like characters of reference denote similar parts throughout the several views—

Figure 1 is a perspective view of a motor-vehicle equipped with a direction and caution indicator constructed and applied to the vehicle in accordance with my invention.

Fig. 2 is a detail of the front elevation showing the means for actuating the indicator.

Fig. 3 is a detail of the gear connections and the locking means for normally holding the turning indicator in a locked position.

Fig. 4 is a detail showing a portion of the turning indicator and supporting means therefor in section and the pivotal connection of the caution indicator.

Fig. 5 is a detail taken on line $x-x$ of Fig. 2, looking in direction of the arrow.

Fig. 6 is a plan view of the back of the caution indicator.

Fig. 7 is a side elevation thereof.

Fig. 8 is a detail in plan view showing the notched locking plate.

Referring to the accompanying drawings, the reference character A designates a motor-vehicle; B designates the friction clutch foot pedal; C the wind shield arm; and D the steering wheel post.

In carrying out the aim of my invention, I employ a suitable housing 1, which is preferably suitably secured to the side of the vehicle, as clearly shown in Fig. 1.

A suitable hollow supporting bracket 2 having an offset arm portion 3, is adapted to be suitably secured to one edge of the wind-shield frame C.

A vertically disposed tubular guide member 4 is adjustably carried by means of the bracket 2. The wall of the hollow bracket 2 is preferably slit and connected by means of suitable screws, or other fastening devices 5, to permit the bracket 2 to be drawn up tightly into engagement with member 4 for firmly holding it in any set position.

A vertically disposed hollow rod 6 is adapted to pass through the hollow member 4 and be guided thereby. Collar 7 is suitably secured to the rod 6 adjacent the lower end of the tubular member 4 to prevent extreme upward movement of the tubular rod 6.

A preferably hollow turning indicator 8 is suitably fixed to the upper end of the tubular rod 6. The indicator 8 is preferably provided with a spear shaped head 9, and provided on either side with a preferably red transparent material 10 so as to provide a red turning signal at night.

Suitably secured to the collar 7 adjacent the lower end of the tubular member 4 is a spear shaped pointer 11 which is visible to the driver of the car at all times, so that at a glance he may know definitely the exact position of the turning indicator 8.

A pinion 12 is fixed to the lower end of the tubular rod 6. Tubular rod 6 is adapted to pass through a suitable bearing 13, which is preferably removably mounted upon the bracket 14 of housing 1. Pinion 12 is adapted to mesh with a gear 15. Gear 15 is preferably a segmental gear, as a partial rotation of gear 15 is sufficient to rotate the pinion 12 a complete revolution, owing to the fact that gear 15 is somewhat larger in diameter than pinion 12, as clearly shown in Figs. 2 and 3 of the drawing. Gear 15 is suitably secured or fixed to the outer end of a horizontally disposed hollow shaft 16, oscillatory supported at one end by means of the housing 1 and near its opposite end by means of a suitable bracket 17. A suitable foot pedal 18 is suitably fixed to the hollow shaft 16 which, when actuated by the foot similar to the action of a sewing machine pedal, oscillatory movement is imparted through the gears 12 and 15 to the turning indicator 8, as is manifest.

The means for normally holding the turning indicator in its forward or neutral position consists of the dogs 19 and 20 suitably fixed upon opposite sides of the brackets 17 to the hollow shaft 16. The free ends of the dogs 19 and 20 are adapted to engage the headed ends of the pins 21 and 22 respectively. Pins 21 and 22 are supported by means of a boss 23 secured to or integral with the bracket 17. The pins 21 and 22 are normally held in an extended position by means of the coiled springs 24 and 25, respectively. The pins 21 and 22 are limited in their extended movement by means of a cotter pin or its equivalent 26 secured to the outer ends of the pins 21 and 22.

Fixed to the lower end of the hollow rod 6 is a plate 27 preferably having a beveled upper edge 28. This plate is preferably provided with four equally spaced notches 29, 30, 31 and 32, as clearly shown in Fig. 8. The upper end of a dog 33 is adapted to seat itself in the aforesaid mentioned notches 29, 30, 31 and 32 for normally locking the turning signal in any position which it may be set, as is manifest. The dog 33 is fixed to move with the supporting pin 34 which is pivotally held in position by means of the bracket 14. The lower end of the dog 33 is connected to a coiled spring 35, which spring in turn is secured at its opposite end to the housing 1, as clearly shown in Fig. 3.

In order to return the turning indicator 8 from the right or left signal position to its forward or neutral position without actuating the food pedal 18, specially after turning a corner, I provide the pin 34 with a fixed arm 36. This arm 36 is normally in engagement with the bent end 37 of a suitable fulcrumed lever 38. One end of lever 38 is suitably connected to a push rod 39 which is carried by means of the suitable bearings 40. Push rod 39 is provided at its one end with a bifurcated or forked end 41 adapted to surround the casing 42 of the steering wheel post 43. The casing 42 is preferably cut away as at 44, and the steering wheel post 43 is provided with a suitable cam or lug 45 adapted to strike and engage the fork 41, pushing rod 39 laterally, which imparts movement to the fulcrum lever 38, which lever 38 in turn strikes arm 36 and moves lever 38 thereby disengaging the dog 33 from notch 30, providing the indicator 8 has been signaling to the right, thus permitting the yieldingly supporting pins 21 and 22 to return the turning indicator 8 back to its forward or neutral position at a time when the vehicle has nearly completed its turning movement. A coiled spring 46 is adapted to surround the push rod 39 engaging the forked end 41 at one end and the bearing 40 at the opposite end, which spring is adapted to normally hold the fork 41 of the push rod 39 in engagement with the steering post casing 42, as clearly shown in Fig. 2. A suitable hollow arm 47 is extending rearwardly from the tubular member 4 and is preferably fixed to the upper end of tubular member 4.

A caution indicator 48 is fixed to a pin 49. The pin 49 is pivotally supported at the free end of the arm 47.

The means for actuating the caution indicator 48 consists of an arm 50 fixed to the pivotal pin 49. A bell crank 51 is pivotally supported by means of the pin 52 to the upper end of the tubular member 4. A rod 53 connects one arm of the bell crank 51 to the arm 50, as clearly shown in Fig. 1. The other arm of the bell crank 51 is connected by means of a vertically disposed rod 54 to an arm 55. Arm 55 is fixed to the outer end of a horizontally disposed rod 56. Rod 56 is adapted to pass through the hollow shaft 16 and is provided at its inner end with a preferably curved arm 57. The curved arm 57 is adapted to be held in engagement with a suitable roller pin 58, which pin is carried by means of the friction clutch foot pedal B. The means for normally holding the curved lever 57 in contact with the roller pin 58 consists of a coiled spring 59 which is connected at one end to the rearwardly extending hollow arm 47, and at its opposite end to the wrist portion 60 of the caution indicator 48.

It will be observed that by pushing the friction clutch foot pedal forward that it imparts an oscillatory movement to the curved arm 57, which in turn imparts a downward movement to arm 55 and rod 54, rod 54 in turn actuating the bell crank 51 for moving the caution indicator from a horizontal position to a vertical or caution position. It will be observed that as soon as the foot lever B has been released from pressure the spring 59 will draw the caution indicator into a horizontal position and bring the curved arm 57 back into engagement with the pin 58 of the friction clutch foot pedal B.

In order to be able to actuate the caution signal 48 independently of having to move the clutch lever B, I employ an arm 61 which is fulcrumed as at 62, at one end. The opposite end of the arm 61 is connected to a link 62' which, in turn, is secured at its opposite end to the curved arm 57. It will be seen from this arrangement that by pressing the foot upon button 63 of the fulcrum arm 61 that the free end of the arm 61 will pull the curved arm 57 downwardly without having to move the clutch lever B.

It will be observed that whenever the clutch lever B is moved or disengaging the friction clutch or whenever the arm 61 is moved, rod 56 is partially revolved causing the rod 54 to be pulled downwardly and rod 53 forwardly, which in turn imparts movement to the caution indicator 48 causing it to move to a vertical position, thereby signaling pedestrians and traffic from all directions to slow up or stop, as it is the intention of the driver of the vehicle to slacken speed of the vehicle or stop the same.

For the purpose of illuminating the direction indicator 8 I provide the same with a suitable electric lamp 64 which is connected by means of a conductor 65 to a battery 66. This conductor is preferably provided with a switch 67 for the purpose of cutting out the lamp in the day time.

For the purpose of illuminating the caution indicator 48 I provide the caution indicator with a suitable electric lamp 68 having electrical connection with a terminal 69. A second terminal 70 is secured to the arm 47 and from this terminal 70 there leads a conductor 71 to the battery 66 and from the battery to ground.

It will be observed that by means of the arrangement just described that whenever the caution indicator is moved into its signaled position the terminal 69 will come in contact with terminal 70 thereby closing the circuit and lighting the lamp 68.

The caution indicator is provided with a plurality of small openings 72 for forming the outline of the hand or caution indicator at night, by means of illumination. Each side of the hand is preferably provided with these openings 72, and the edge of the indicator may also be provided with these openings, if desired.

It will be understood that the flash of the light displayed, when the caution indicator 48 reached its vertical or signal position, makes an unmistakable caution signal to slow up or stop at night, and that the hand itself, when moved to a vertical position in the day time, makes an unmistakable signal for traffic and pedestrians from all directions.

It is well known that traffic accidents mostly occur in the mix-up caused by slowing up suddenly and by turning from one traffic stream to another as in going around a corner or around another vehicle, and it will be observed that I have provided a simple, positive and easily operated signal which will display to traffic and pedestrians either a signal turn to slow up or stop, which signals may be displayed simultaneously or independently of one another, as may be desired or necessary.

It will be understood that various changes may be made in the minor details of construction within the scope of the appended claim, and therefore, I do not wish to limit or be limited to the precise details of construction shown and described, but wish it to be distinctly understood that any modified constructions are simply modifications of my traffic signal, and such modifications as come under the scope of this specification and the appended claim I consider within the spirit of my invention.

What I claim is:

A caution-signal for vehicles comprising in combination with a clutch-pedal, of a rotatable horizontally supported shaft, a vertically disposed supporting post, a caution-signal pivotally connected to said supporting post, a connection between said caution-signal and said horizontally disposed rotatable shaft, a clutch-pedal engaging arm fixed at one end to said shaft and adapted to be moved in an arcuate path when depressing the clutch-pedal to impart a partial rotary movement to said horizontally supported rotatable shaft and thereby lift said caution-signal from its normal horizontal position to its upright signal position, independent foot actuated means having connection with said clutch-pedal engaging arm for imparting a slight rotary movement to said horizontally supported rotatable shaft to lift said caution-signal to its upright signal position without depressing the clutch-pedal, and resilient means for returning said caution-signal to its normal horizontal position from its upright signal position.

In testimony whereof, I have hereunto signed my name to the specification.

JOSEPH G. ANTHONY.